US006666362B1

(12) United States Patent
LeTrudet

(10) Patent No.: US 6,666,362 B1
(45) Date of Patent: Dec. 23, 2003

(54) CARGO MANAGEMENT CONTAINER/ ORGANIZER ATTACHMENT APPARATUS AND METHOD

(75) Inventor: Stephane L. LeTrudet, Wixom, MI (US)

(73) Assignee: SAI Automotive USA-SAL, Inc., Farmington Hills, MI (US)

( * ) Notice: Subject to any disclaimer, the term of this patent is extended or adjusted under 35 U.S.C. 154(b) by 0 days.

(21) Appl. No.: 09/502,250

(22) Filed: Feb. 17, 2000

(51) Int. Cl.⁷ .................................................. B60R 7/00
(52) U.S. Cl. ........................ 224/547; 224/42.4; 410/82; 410/90
(58) Field of Search ................................ 224/539, 547, 224/42.4, 319, 404; 410/82, 90

(56) References Cited

U.S. PATENT DOCUMENTS

| | | | |
|---|---|---|---|
| 3,034,256 A | | 5/1962 | Bonanno |
| 3,159,368 A | * | 12/1964 | Ahlbin et al. ................ 224/520 |
| 3,334,953 A | * | 8/1967 | Becker ...................... 65/182.3 |
| 3,618,795 A | | 11/1971 | Burch |
| 4,249,684 A | * | 2/1981 | Miller et al. .................. 109/51 |
| 4,303,367 A | | 12/1981 | Bott |
| 4,325,531 A | | 4/1982 | Omholt |
| 4,737,055 A | | 4/1988 | Scully |
| 4,805,859 A | | 2/1989 | Hudson |
| 4,901,961 A | * | 2/1990 | Gish ............................... 16/8 |
| 5,161,700 A | | 11/1992 | Stannis et al. |
| 5,205,602 A | | 4/1993 | Hoare et al. |
| 5,240,214 A | * | 8/1993 | Birnbaum et al. .......... 248/214 |
| 5,511,842 A | * | 4/1996 | Dillon ........................ 224/400 |
| 5,588,631 A | | 12/1996 | Yee |
| 5,609,451 A | | 3/1997 | McCorkle, Jr. |
| 5,653,366 A | * | 8/1997 | Liserre ....................... 220/481 |
| 5,730,414 A | | 3/1998 | Wenger et al. |
| 5,855,310 A | | 1/1999 | Van Ert et al. |
| 5,899,544 A | | 5/1999 | James et al. |

* cited by examiner

*Primary Examiner*—Stephen K. Cronin
(74) *Attorney, Agent, or Firm*—Lerner, David, Littenberg, Krumholz & Mentlik, LLP

(57) ABSTRACT

An apparatus and method for storing cargo in a vehicle having a flat horizontal surface, such as a van or an SUV, is disclosed. Strips, which may be separate or part of a unitary member, have openings adapted to receive pins. The openings have vertical sections extending downwardly and horizontal sections extending forward in the direction of vehicle travel. The bins have an upper storage area and pins mounted at the bottom of the bin. The bin is mounted to the strips by directing the pins first through the vertical section and then through the horizontal section of the openings. The pins may extend outwardly from a reduced width area at the bottom of the bin, or may be centrally mounted at the bottom of the bin. Alternatively, pins are mounted to the strips and openings are formed in the bins. The strips may be formed into a unitary frame. Flat filler boards are also provided which may be placed between the strips when no storage bin is used in order to provide a flat surface.

24 Claims, 11 Drawing Sheets

CARGO MANAGEMENT CONTAINER/ ORGANIZER ATTACHMENT APPARATUS AND METHOD

FIELD OF THE INVENTION

This invention relates to storage systems. More particularly, the present invention relates to systems for storing cargo in a safe and secure manner within motor vehicles.

BACKGROUND OF THE INVENTION

The last part of the 20th century saw substantial growth in motor vehicles which differ from the traditional sedans which were popular earlier in the century. After several decades in which station wagons were popular (particularly in what were then new suburban areas), there was a substantial period during which minivans became popular, not only for business usage, but for personal and family usage as well. Then, in the 1990s, sport utility vehicles became extraordinarily popular, eventually comprising a substantial portion of the overall automotive market.

One advantage of all of these categories of non-sedan vehicles is the increased space allowed for the storage of cargo. While many traditional sedans (typically the largest "full-size" sedans) have always included trunks with considerable storage capacity, the growth in popularity of non-sedan vehicles has resulted in large measure from the need and desire to carry either more cargo, or larger cargo, or both.

The particular cargo carried in motor vehicles has also become incredibly diverse. Many early vans were used to carry tools, equipment and other business and professional materials; and such usage has continued. However, the boom in non-sedan vehicles has been caused in no small measure by the desire of individuals to carry cargo of a more personal and recreational nature. Such cargo includes coolers for keeping food and beverages cold. It also includes cages and other paraphernalia associated with pets, as well as equipment for fishing, hunting, first aid and the like. On the most mundane day-to-day level, vehicles are of course used on a regular basis to haul groceries and other purchases from the supermarket to one's home.

One chronic problem with carrying cargo in such vehicles is actually a consequence of there being too much space: the cargo can readily shift and move around within the cargo storage area, which can occur during a sharp turn or a quick braking situation. Heavy items can move and crush lighter items. Thus, a need for a system to hold cargo in place has long existed.

Various solutions to these problems have been proposed in the past, but each has had one or more drawbacks. One simple solution is the use of netting or other cord-like materials to hold bags of groceries and other materials in place. Such solutions are often inadequate, inasmuch as the netting may become tangled, and the inertia of the cargo can often overwhelm the slender holding power of such systems.

Numerous other schemes for storing cargo in vehicles have been proposed. These include U.S. Pat. No. 4,303,367 to Bott; U.S. Pat. No. 4,325,531 to Umholt; U.S. Pat. No. 4,805,859 to Hudson; U.S. Pat. No. 5,161,702 to Stannis et al.; U.S. Pat. No. 5,588,631 to Yee; U.S. Pat. No. 5,730,414 to Wenger et al.; U.S. Pat. No. 5,855,310 to Van Ert et al.; and U.S. Pat. No. 5,899,544 to James et al. But each of these schemes have drawbacks as well. Several are complex and expensive, or require unusual installations, or involve installations which then detract from the overall versatility of the vehicles—a feature which makes such vehicles attractive in the first instance.

Accordingly, it is an object of the present invention to provide a storage system which is inexpensive, simple to install, and simple to use.

It is a further object of the present invention to provide such a system which is versatile and thus allows for the storage of different types of cargo with a single system.

It is another object of the present invention to provide such a system which also allows for conventional storage of cargo in the vehicle without the necessity of undoing any installation.

It is yet another object of the present invention to provide such a system which safely stores cargo and protects against shifting and other movement while the vehicle is turning or braking.

SUMMARY OF THE INVENTION

In accordance with the present invention, an apparatus for providing storage space in a vehicle having a substantially flat horizontally oriented surface includes at least one strip adapted to be mounted to the flat surface of the vehicle, as well as at least one storage bin having an upper storage area. At least one pin is mounted to either the lower portion of the storage bin or to the strip, with the pin extending transversely to the direction of travel of the vehicle. At least one opening is formed in the other of the lower portion of the storage bin and the strip. The pin is adapted to be received in the opening to securely hold the bin to the strip. The opening has a substantially vertical entrance segment connected to a substantially horizontal segment extending in the direction of travel of the vehicle, such that deceleration of the vehicle urges the pin more deeply into the horizontal segment.

As a further aspect of the present invention, the pin may be mounted to the strip and the opening is formed in the lower portion of the storage bin. Alternatively, the pin is mounted to the lower portion of the storage bin and the opening is formed in the strip. Where the pin is mounted to the lower portion of the storage bin, in one embodiment of the present invention, the pin is mounted proximate the center of the bottom of the bin and the opening is formed in the top surface of the strip. Alternatively, the pin extends outwardly from the bin and the opening is formed proximate a longitudinal edge of the strip.

As a further aspect of the present invention, the strips may be positioned parallel to one another and may also be oriented in a longitudinal direction corresponding to the direction of travel of the vehicle. In a further aspect of the present invention, the strips form part of a unitary support member. In certain of such embodiments, the strips are oriented in a longitudinal direction corresponding to the direction of travel of the vehicle, and the strips are connected to each other by at least one cross-piece oriented in a direction substantially transverse to the direction of travel.

As yet a further aspect of the present invention, at least one flat filler board is adapted to be inserted between the strips when no bin is being used so that the upper surface of the flat filler board and the upper surfaces of the strips provide a substantially flat horizontal surface, thus allowing cargo which is not stored within a bin to be rested thereon. The flat filler boards may include pins extending from opposite sides thereof, or openings formed therein, which may engage with openings in the strips or pins mounted to the strips. The flat filler boards may also have an upper surface which includes a material adapted to provide friction and to cushion the cargo which is resting thereon.

In accordance with certain preferred embodiments of the present invention, an apparatus for providing storage space in a vehicle having a substantially flat, horizontally oriented surface includes a plurality of strips. The strips are adapted to be mounted to the flat surface of the vehicle. At least two of the strips have openings facing toward each other which are adapted to receive pins affixed to a storage bin. At least one storage bin has an upper storage area and a plurality of pins extending outwardly from the bottom of the bin. At least one of the pins extends from each of two opposite sides of the storage bin. The pins are adapted to be received in the openings in the strips. The storage bin is thus positioned between the strips, with the pins extending from the bin engaging with the openings in the strips, so that the bins are securely held against the strips.

As a further aspect of the present invention, the storage bins have at least two pins extending from each of two opposite sides. Such pins may be spaced apart from each other to provide support over substantially the entire length of the storage bin.

As yet a further aspect of the present invention, the storage bins have a lower portion which is reduced in width with respect to the upper portion of the storage bin. The pins extend outwardly from the reduced width portion of the bin. The length of the bins may be such that they do not extend beyond the width of the remaining portion of the storage bin, thus providing protection of the pins from breakage, bending or the like.

In accordance with another preferred embodiment of the present invention, an apparatus for providing storage space in a vehicle having a substantially flat horizontally oriented surface includes at least one strip having a substantially flat top surface adapted to be mounted to the horizontally oriented surface of the vehicle, with the strip having an opening in the flat top surface adapted to receive a pin affixed to a storage bin. At least one storage bin has an upper storage area and a pin mounted proximate the bottom of the bin. The pin is adapted to be received in the opening in the strip, whereby when the storage bin is positioned above the strip, the pin mounted to the bin engages with the openings in the strip, such that the bin is securely held against the strip. As a further aspect of the present invention, the opening on the strip comprises a substantially vertically oriented segment extending downwardly from the top surface of the strip to the interior of the strip, and a horizontal segment extending horizontally from the lower portion of the vertical segment. As a further aspect of the present invention, the bin includes a bottom surface and an upwardly extending recess formed in the bottom surface of the bin, and at least one pin extends across the recess.

In accordance with still further preferred embodiments of the present invention, an apparatus for providing storage space in a vehicle having a substantially flat horizontally oriented surface includes a plurality of strips adapted to be mounted to the flat surface of the vehicle, with at least two of the strips having pins extending outwardly therefrom and being adapted to be received in openings in the storage bin. At least one storage bin has an upper storage area and openings formed proximate the bottom of the bin, with at least one such opening being formed in each of two opposite sides of the storage bin, such openings being adapted to receive pins on said strips. When the storage bin is positioned between the strips, the pins extending from the strips engage with the openings in the bin, such that the bins are securely held against the strips.

The present invention also includes methods of providing storage space in a vehicle having a substantially flat horizontally oriented surface. The method includes providing at least one strip adapted to be mounted to the flat surface of the vehicle and at least one storage bin having an upper storage area. At least one pin is mounted to either the lower portion of the storage bin or to the strip, with at least one opening formed in the other of the lower portion of the storage bin and the strip. The pin is adapted to be received in the opening. The opening has a substantially vertical entrance leading to a horizontal segment. The method of the present invention includes mounting the strip to the flat surface of the vehicle, and mounting the storage bin to the strip such that the pin enters the vertical entrance of the opening and then enters into the horizontal segment of the strip. The mounting steps position the pin so that it extends transversely to the direction of vehicle travel, and positions the horizontal segment of the opening such that deceleration of the vehicle urges the pin more deeply into the horizontal segment.

DETAILED DESCRIPTION

Figure 1:
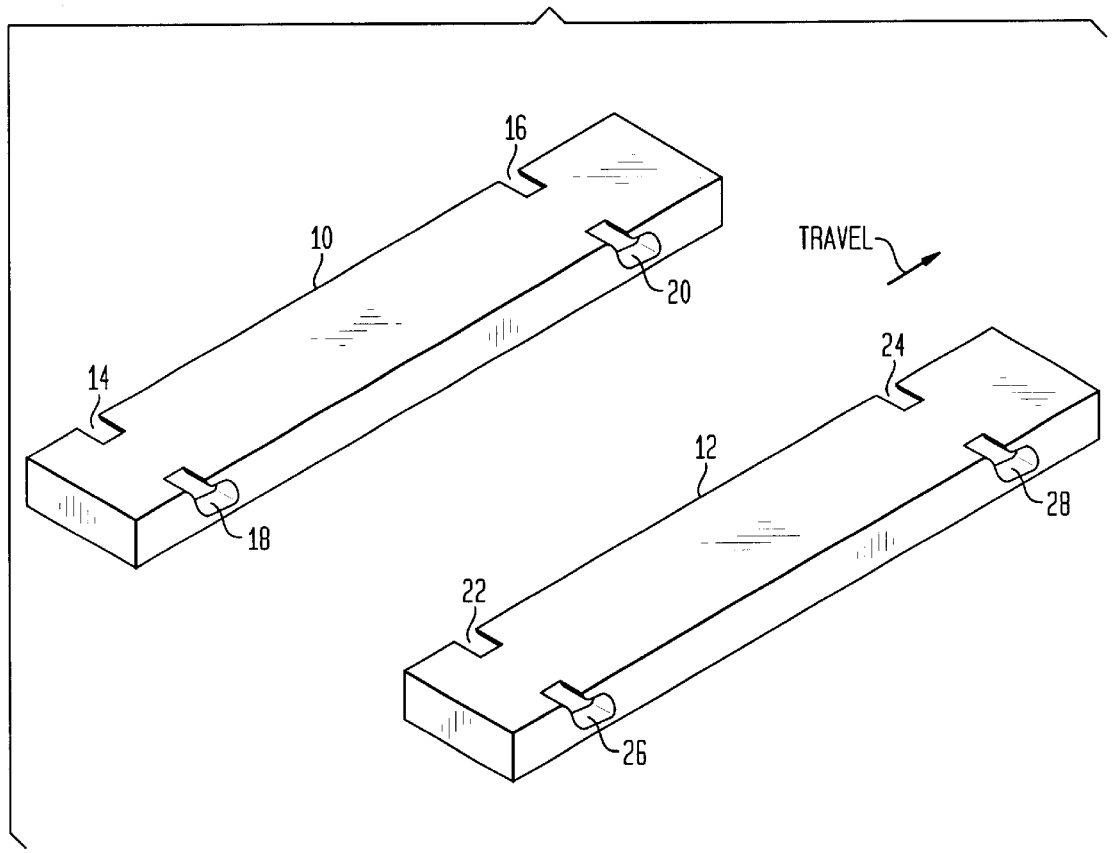
FIG. 1 is a perspective view of two separate unitary strips as employed in the present invention.

Referring now to the drawings, and particularly FIG. 1, there is shown two of the strips employed in one embodiment of the present invention. In particular, illustrated in FIG. 1 are two separate strips 10, 12, which may be made from molded plastic or any other suitable material. The strips 10 and 12 are adapted to be mounted to a flat horizontal surface within a vehicle, such as the rear area of a van, a sports utility vehicle or the like. The mounting may be accomplished with screws, adhesives, double-sided tape or in various other manners which will be apparent to those skilled in the art.

Each strip 10 includes openings adjacent the longitudinal edges of the strip. Thus, strip 10 has openings 14, 16 along one longitudinal edge and openings 18, 20 along the opposite longitudinal edge. Similarly, strip 12 has openings 22, 24 along one longitudinal edge, namely the edge across from openings 18 and 20 of strip 10, and openings 26 and 28 along the opposite longitudinal edge of strip 12. It will be appreciated below that in the initial embodiment of the invention discussed herein, only openings 18, 20, 22 and 24 are used for the storage of a single bin, although it will be understood at a subsequent point in this specification why it is advantageous to have openings on both edges of each strip.

Each of the openings are shaped in substantially the same manner, and may be generally described as having an "L" shape. In accordance with this L shape, and as best seen in FIGS. 1, 4, 5, 6A and 6B, there is a vertically oriented segment extending downwardly from the upper surface of the strips 10 and 12 toward the interior of the strips. The openings then extend horizontally in a longitudinal direction with respect to the strips.

For reasons which will be appreciated below, the strips 10 and 12 are preferably mounted to the vehicle surface substantially parallel to each other. In addition, they are preferably oriented in the direction of forward travel of the vehicle as shown in FIG. 1. More particularly, the horizontal segments of the openings 14, 16, 18, 20, 22, 24, 26 and 28 extend horizontally from the vertical segments in the same direction of forward vehicle travel.

The mounting of the strips 10 and 12 to the vehicle surface may be accomplished in any one of number of ways. In certain instances, particularly where the vehicle surface is carpeted or otherwise has a high degree of friction, the mounting may be accomplished simply by resting the strips on the vehicle surface. Alternatively, fasteners may be employed, for example, by forming holes in the strips 10 and 12 to allow for bolts to securely fasten the strips 10 and 12 to the vehicle surface.

Figure 2:
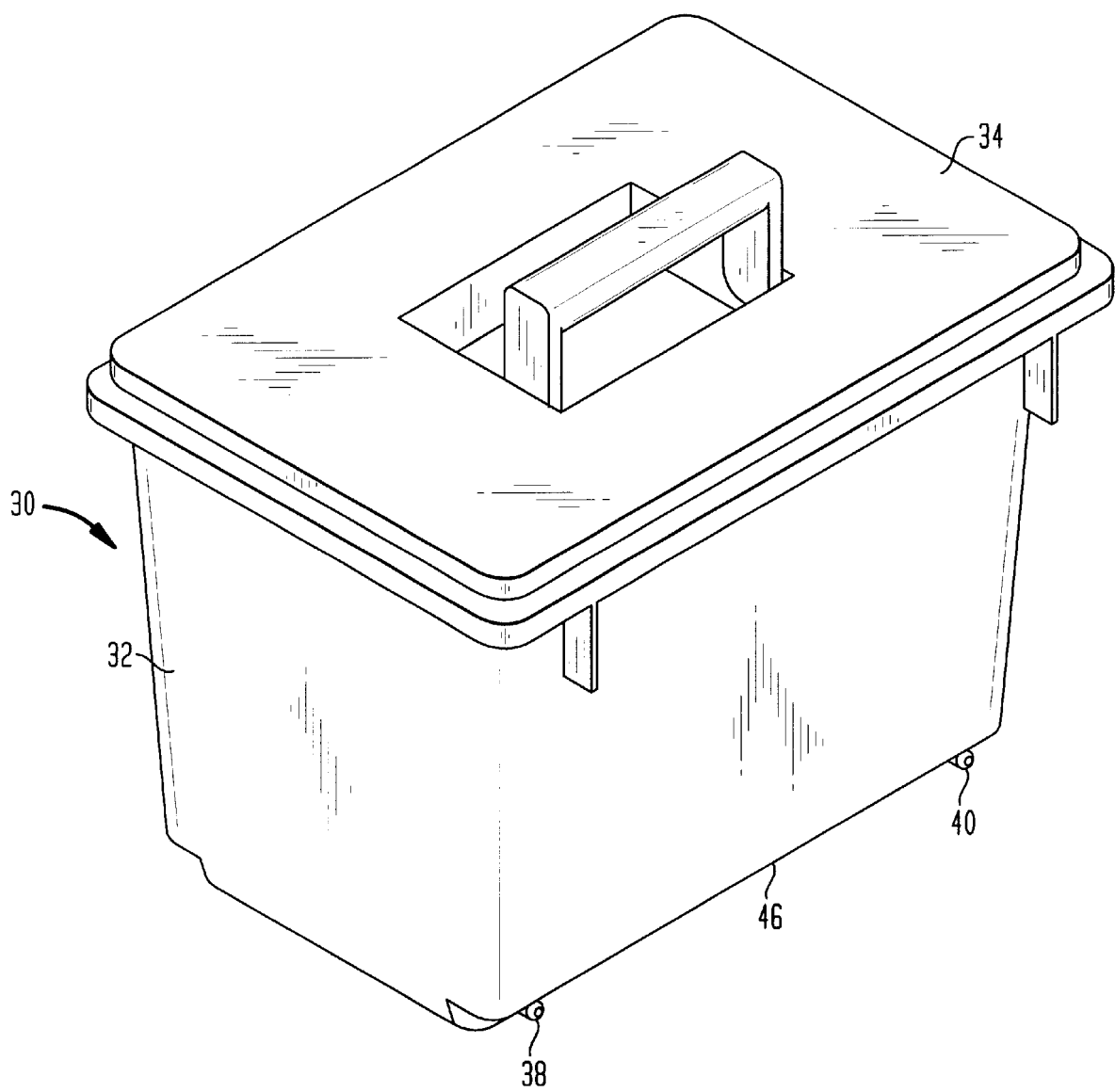
FIG. 2 is one perspective view of one type of storage bin employed with the present invention.
Figure 3:
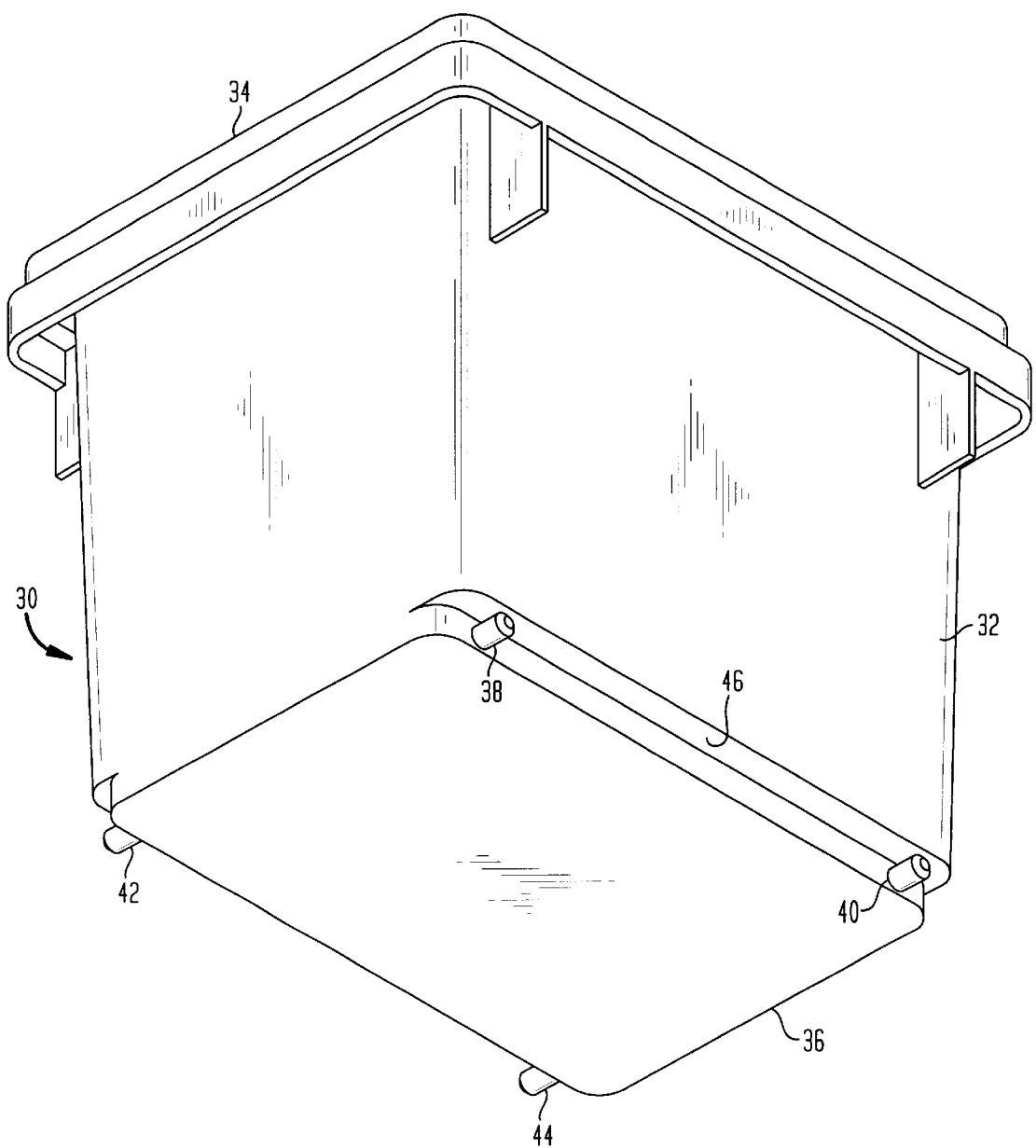
FIG. 3 is a different perspective view of the storage bin shown in FIG. 2, better illustrating the pins extending from the storage bin.

The storage bins of the present invention are illustrated in FIGS. 2 and 3, which show the same storage bin from two different angles. The storage bin identified generally as 30 has an upper storage area 32. In the embodiment shown in FIGS. 2 and 3, the upper storage area 32 is an enclosed container which may be formed of plastic and which may have an optional lid 34. It will be appreciated, however, that the upper storage bin can be configured in numerous other shapes and configurations, such as a pet cage; a cooler; a tool box; a first aid kit; a fishing kit or the like. Indeed, one advantage of the present invention is that the same strips 10 and 12 may be used with a variety of different storage bins 30 without having to alter the original installation in the vehicle.

As best seen in FIG. 3, at the lower portion of storage bin 30 is an area of reduced width 36. Extending from the reduced width area 36 are a plurality of pins. In particular, along one edge of the reduced width area 36 of storage bin 30 are pins 38 and 40, while pins 42 and 44 extend from the opposite edge of the reduced width area 36. The pins 38, 40, 42 and 44 are integrally molded or otherwise mounted to the storage bin 30. They may be configured with a generally round shape, although other shapes may be employed, as will be discussed hereinafter.

It will be appreciated from FIGS. 2 and 3 that the reduced width area 36 creates an overhang 46. The pins 38, 40, 42 and 44 preferably do not extend from the reduced width area 36 a distance which would cause them to extend outwardly beyond the overhang 46. The overhang 46 thus acts to protect the pins 38, 40, 42 and 44 from being accidentally broken off during handling.

The pins on the storage bin 30 are positioned in a manner to correspond with the openings on the strips 10 and 12. Thus, to position a bin 30 between strips 10 and 12, the pins 38 and 40 must be positioned and spaced in a manner corresponding to the position and spacing of the openings 22 and 24 in strip 12; and similarly, the pins 42 and 44 must be positioned and spaced in a manner corresponding to the openings 18 and 20 in strip 10.

Figure 4:
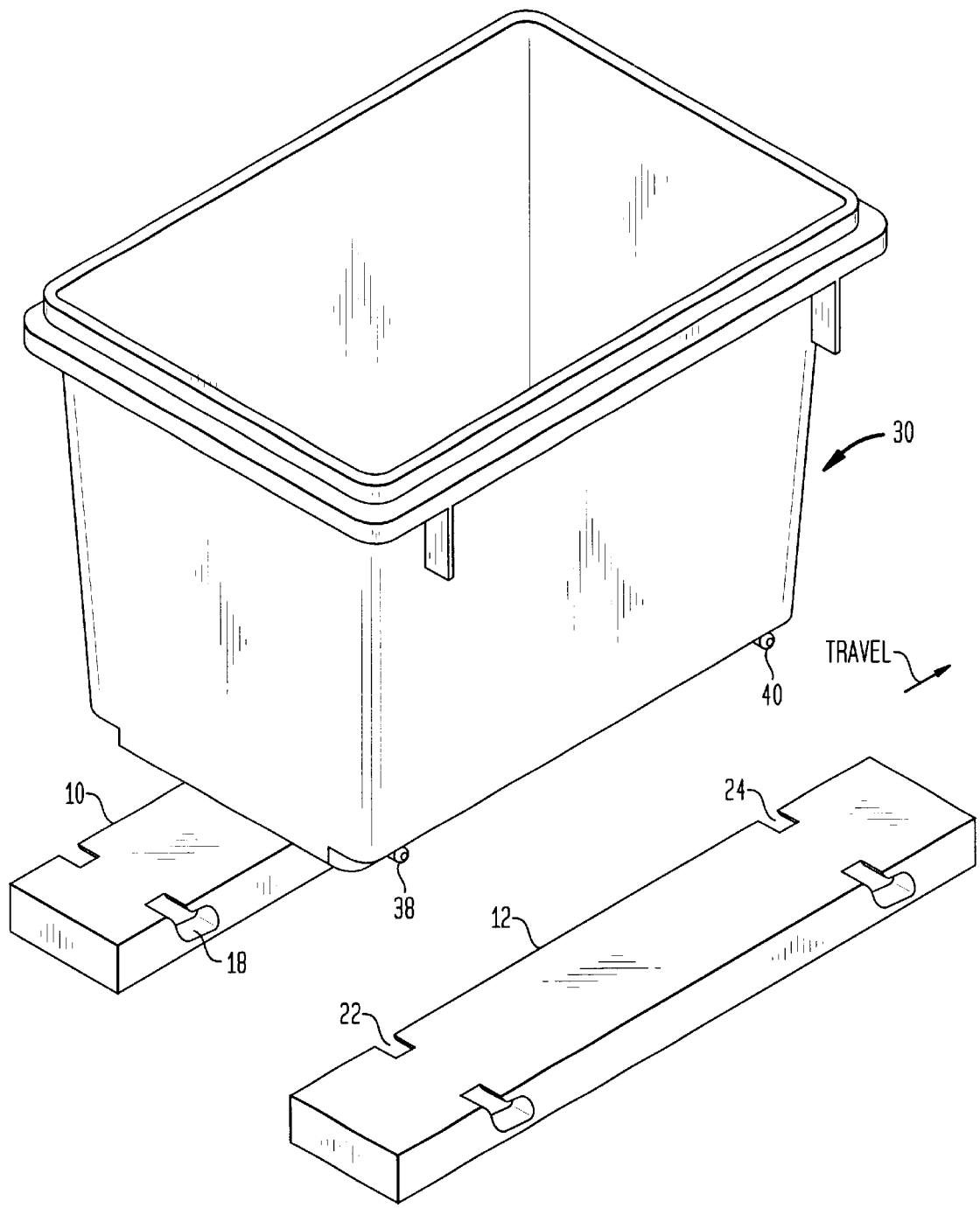
FIG. 4 is a perspective view of the strips shown in FIG. 1 and the storage bin shown in FIGS. 2 and 3 in which the bin is in a position for installation upon the strips.
Figure 5:
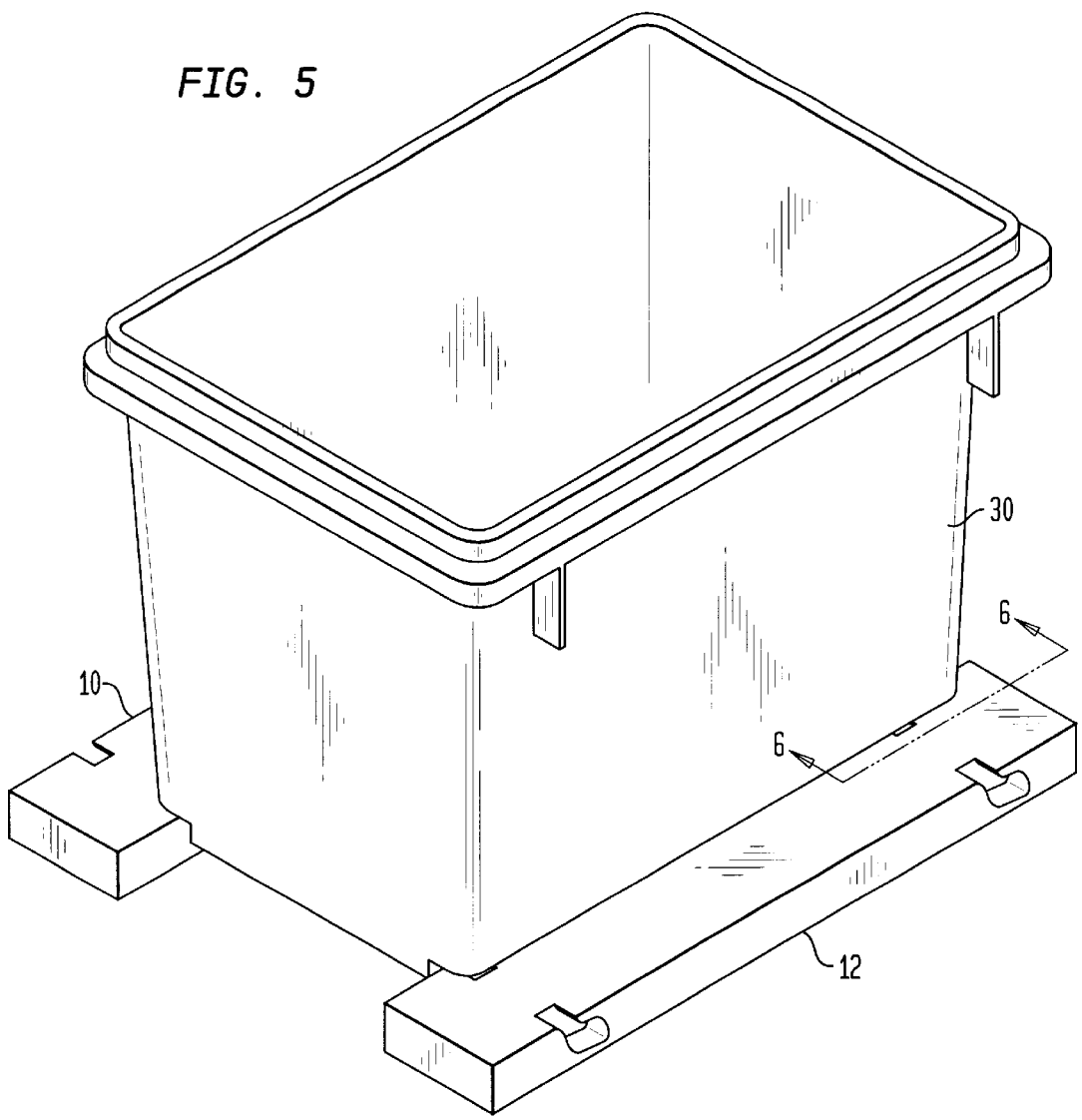
FIG. 5 shows the strips shown in FIG. 1 and the storage bin shown in FIGS. 2 and 3 after the storage bin has been installed on the strips.

The engagement of the storage bin 30 with the strips 10 and 12 is illustrated now in FIGS. 4 and 5. As shown in FIG. 4, the storage bin 30 is initially positioned above the strips 10 and 12 such that the pins 38, 40, 42 and 44 are lined up vertically above the openings 22, 24, 18 and 20 respectively. The storage bin 30 is then lowered vertically, so that the pins enter the upper vertically oriented segments of the openings. Once the storage bin with its pins reaches bottom, the storage bin 30 is then moved longitudinally in the direction of vehicle travel, such that the pins enter and proceed toward the end of the horizontal segments of the openings. It will be readily understood that detents or the like may be molded into the openings in order to more firmly snap the pins into place once they reach the forward ends of the horizontal segments.

Figure 6A:
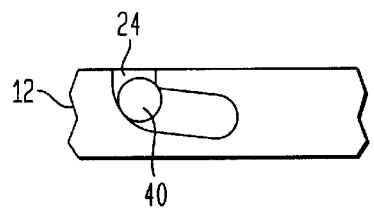
FIG. 6A is a partial cross-sectional view along the lines 6—6 in FIG. 5, showing a pin of the present invention during the initial part of the installation within an opening of the present invention.
Figure 6B:
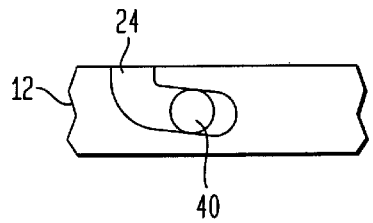
FIG. 6B is a partial cross-sectional view along the lines 6—6 in FIG. 5 showing a pin of the present invention almost fully installed within an opening of the present invention.

FIGS. 6A and 6B illustrate the engagement of the pins with the openings. FIG. 6A illustrates an opening such as opening 24 in which pin 40 has been inserted into the opening and has been initially moved downward toward the interior of the strip 12. FIG. 6B shows the same opening and pin after the bin has been moved horizontally in the direction of forward travel, in which the pin 40 has approached the outer limit of the opening 24.

Figure 13:
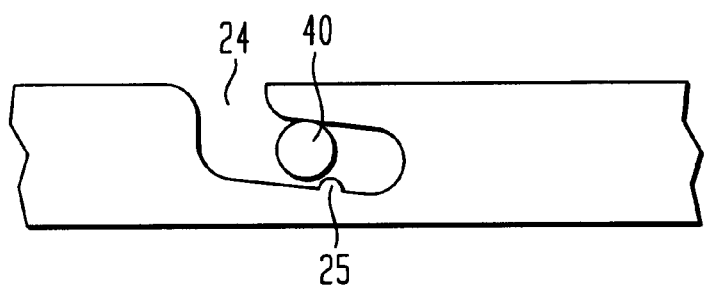
FIG. 13 is a schematic detail showing the structure of an opening of the present invention which releasably locks the pin within the opening.

FIG. 13 illustrates a further refinement which may be employed in connection with the mating of the pin 40 with the opening 24. As shown in FIG. 13, a bump or protrusion 25 may be formed within the opening 24 having an appropriate size relative to the size of the opening 24 and the diameter of the pin 40 such that the pin may be moved past the bump 25 and snap into place beyond the bump 25, thus releasably locking the pin 40 within the opening 24. Other techniques may be employed to provide a releasable locking relationship between the opening 24 and the pin 40, such as, for example, angling or sloping either or both of the horizontal walls of the opening 24 to form an increasingly narrow space whereby the pin 40 becomes wedged within the opening 24.

It will be appreciated from the foregoing that while each pin of a storage bin in the present invention must have a corresponding opening on a strip, it may be advantageous to include additional openings in the strips which may not necessarily be used with a given bin. Thus, the strips 10, 12 might have five openings, and a particular bin might use only certain of those openings. It will also be appreciated that more than two strips may be employed in a given vehicle. This would allow, for example, two or more bins to be mounted between different pairs of strips, or one bin having two reduced width areas to straddle the strips, in the manner show in FIG. 10.

In the embodiment shown in FIGS. 1 through 6, the storage bin 30 has two pins on each side. It will be appreciated that having at least two pins along at least one side protects the apparatus from the bin swinging upwardly during braking of the vehicle or the like. While the present invention could be employed with only a single pin on each side, it is presently preferred that there be at least two pins on each side.

It will also be appreciated that while the openings in the strips 10 and 12 are aligned with each other, and that the pins on each side of the storage bin 30 are similarly aligned with each other, this is not necessary to achieve the advantages of the present invention. On the contrary, the present invention could be employed with the openings and pins staggered with respect to each other, provided of course that each pin has a corresponding opening.

It will have been noted by this juncture that the horizontally extending openings in the strips 10 and 12 have been illustrated as extending in the direction of vehicle travel. It has been found that orienting the horizontal portions of the openings in this direction provides the advantage of the connection between the storage bin and the strips actually tightening up whenever there is a rapid deceleration of the vehicle. As will be readily apparent, when the vehicle decelerates, the momentum of the storage bin (particularly if it is filled with cargo) will cause the pins to be urged toward the ends of the horizontal portions of the openings, thus tightening the engagement between the storage bin and the strips.

Figure 8:
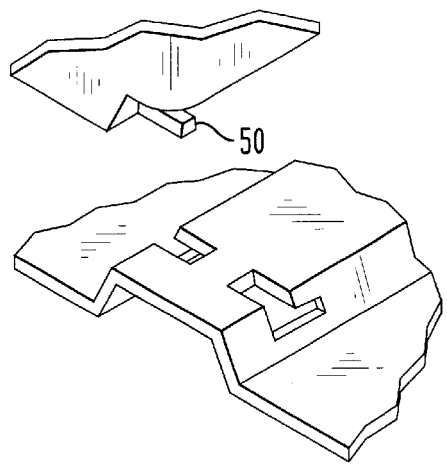
FIG. 8 is a partial perspective view of a different embodiment of the present invention showing pins having a different shape from those shown in the earlier embodiments.

As was noted above, the pins of the present invention have been shown to be substantially cylindrical in cross-section. However, other shapes and configurations can be employed. For example, FIG. 8 illustrates an embodiment in which the pin 50 has a more rectangular configuration. It will be understood by those skilled in the art that still other shapes and configurations can be employed, provided that the openings in the strips have corresponding sizes and shapes to accommodate the pins.

Figure 7:
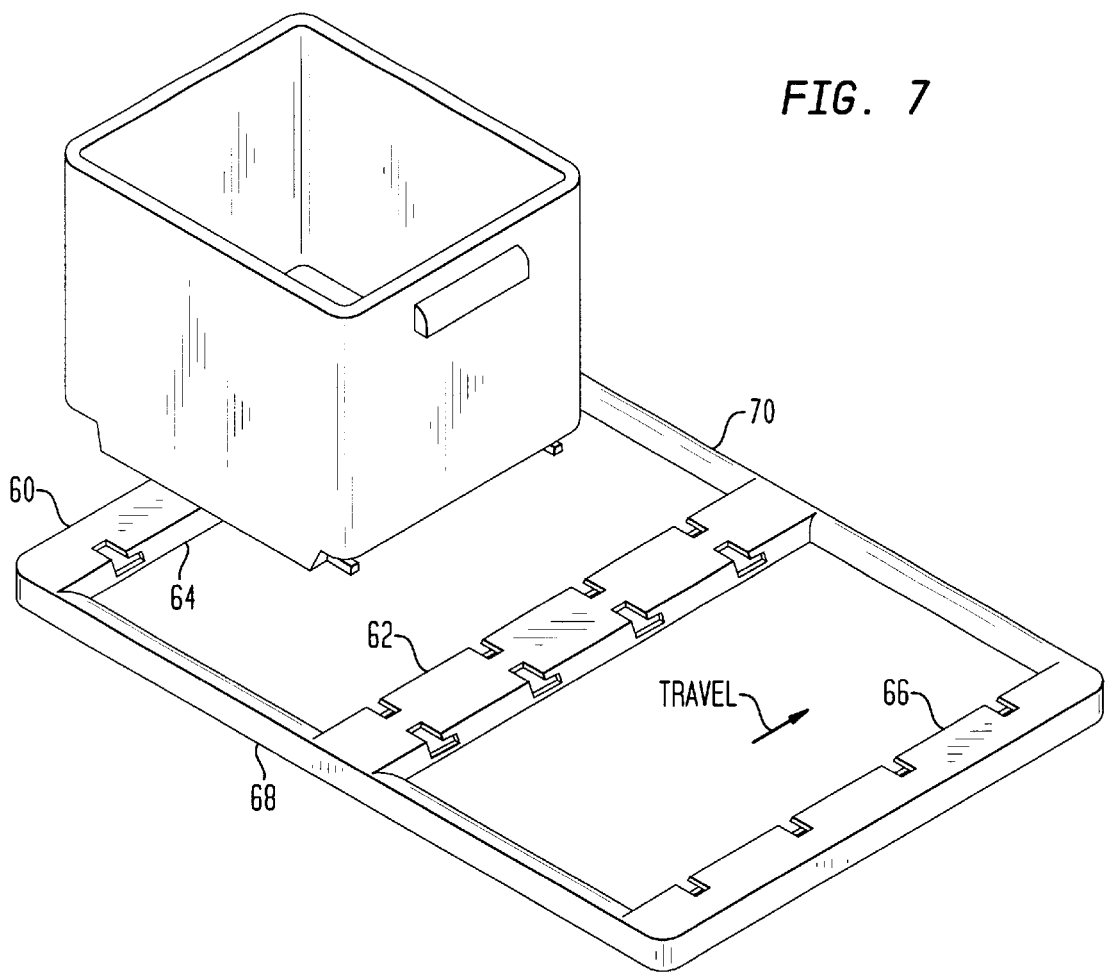
FIG. 7 is a perspective view of a different embodiment of the present invention in which the strips form part of a unitary member.

While we have to this point described embodiments of the invention in which the strips are separate units which must be mounted separately (and preferably parallel to each other) in the vehicle, FIG. 7 illustrates a further embodiment of the present invention involving a single and unitary support member 60. As can be seen in FIG. 7, unitary support member 60 includes an inner strip 62 which is substantially similar to the strips 10 and 12 discussed previously, as well as outer strips 64 and 66 which are arranged parallel to inner strip 62. The outer strips 64 and 66 need only have openings on their interior edges, while the inner strip 62 has openings on both of its longitudinal edges. In addition, unitary support member 60 has transverse cross-pieces 68 and 70. It will be understood that the unitary support member 60 can be formed as an integral unit by means of plastic molding or other processes, or can be assembled from components. However, a preformed integral unitary support member 60 provides assurances that the spacing of the strips 64, 62 and 66 is correct and will accommodate storage bins having pins designed to fit within strips having given spacing therebetween.

A unitary support member 60 may be mounted to the vehicle surface in the manner described previously. It will be appreciated that a unitary support member 60 having several connected components will be more likely to be successfully mounted to the vehicle surface without any fasteners, given the size and weight of the unitary support member 60. In addition, depending upon the size and shape of the storage space within the vehicle, a unitary support member 60 may be constructed in a manner whereby it fits tightly within the allotted space, thus making it essentially impossible for the unitary support member 60 to move in a horizontal direction even without any rigid fasteners.

Figure 9:
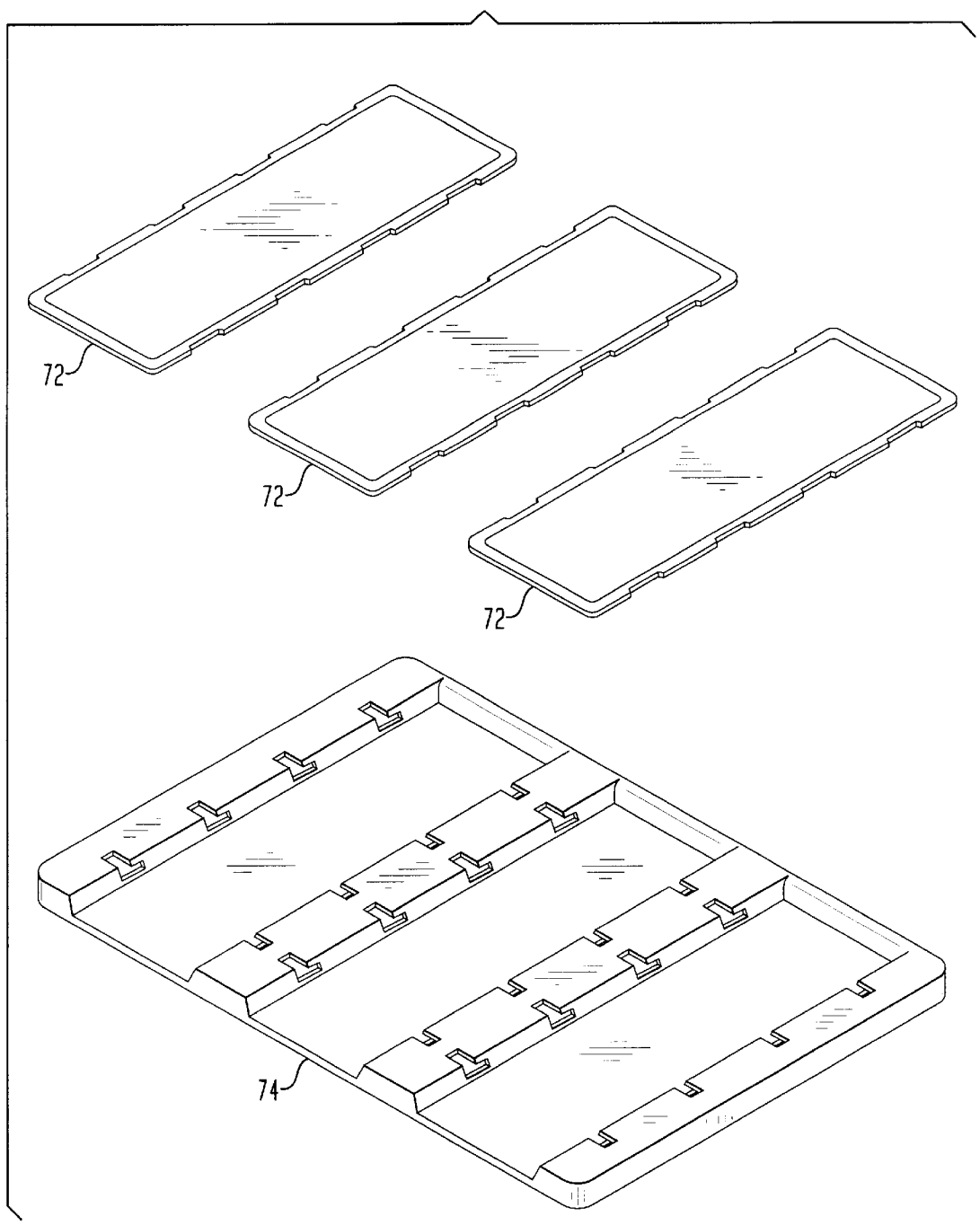
FIG. 9 is a perspective view of a further embodiment of the present invention including a unitary support member and flat filler boards adapted to be inserted within the spaces of that unitary support member.

FIG. 9 shows an additional feature of the present invention, namely flat filler boards 72. To appreciate the benefit of boards 72, it will be recognized that while a user might wish to permanently mount a unitary support member to the vehicle, there will be times when the vehicle must be used to transport large items which cannot fit in any storage bin of the type employed in the present invention, such as a piece of furniture. Rather than remove the unitary support member, the flat filler boards 72 may be employed. FIG. 9 illustrates an embodiment of the present invention in which the unitary support member 74 has four strips (two outer strips and two inner strips). If storage bins are not going to be employed with the unitary support member 74 at a particular time, a flat filler board 72 may be inserted between the strips to thus fill the spaces between the strips.

The boards 72 are preferably flat and have a thickness which results in the upper surface of the boards being approximately coplanar with the upper surface of the strips, thus presenting a generally flat and uniform surface upon which can be rested a large object, such as a piece of furniture. The boards 72 may be provided with pins of the type used with storage bins of the present invention; alternatively, the boards may simply rest flat between the appropriate strips without any locking engagement mechanism. The boards 72 may be advantageously covered on their top surfaces with carpet fabric or the like, which can provide not only cushioning for the item being carried in the vehicle, but also a degree of friction to prevent the item from sliding around during movement of the vehicle.

Figure 10:
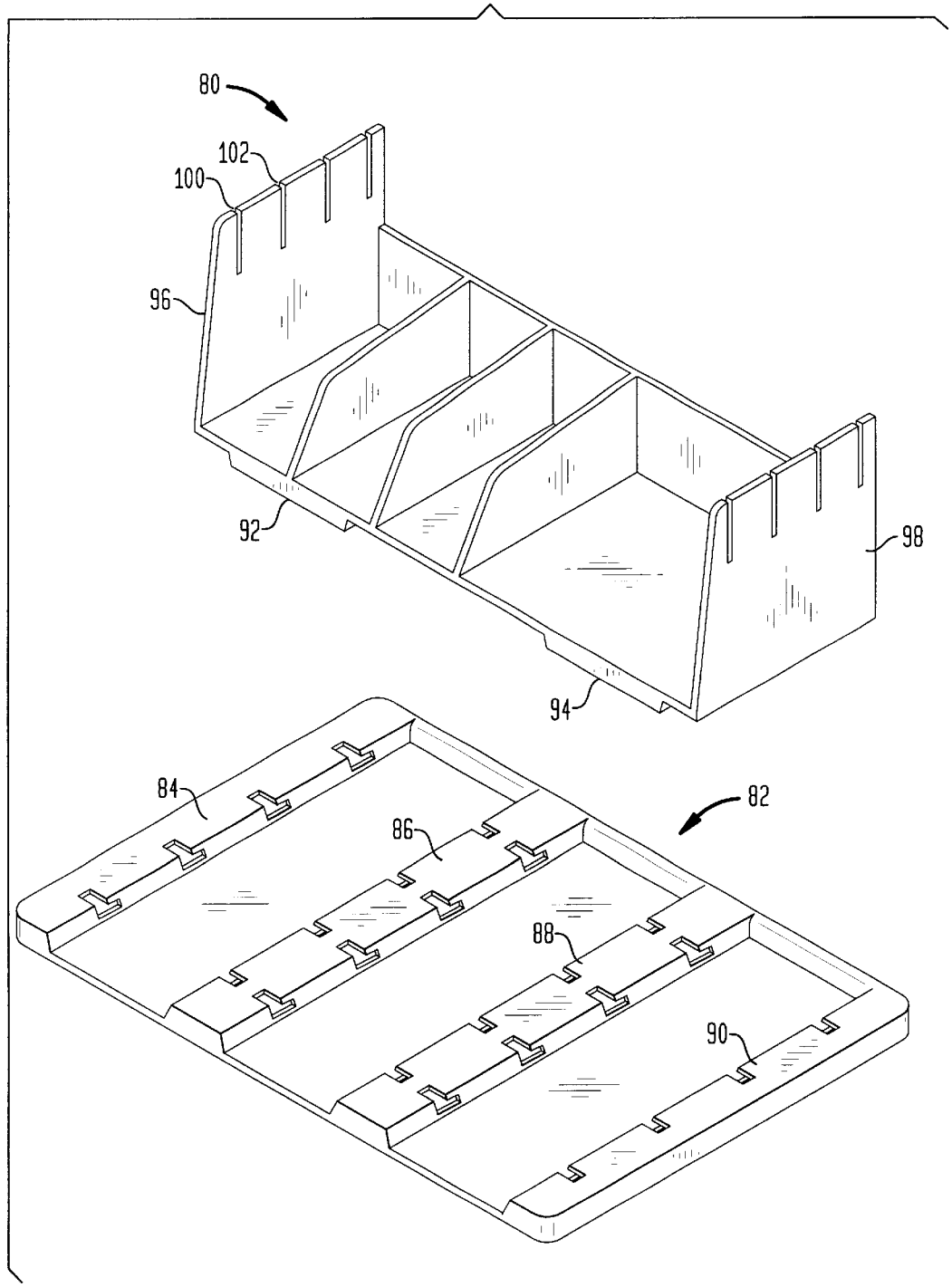
FIG. 10 is a perspective view of a further embodiment of the present invention showing a particular type of storage bin of the present invention adapted to be mounted on a particular unitary support member of the present invention.

As suggested above, a single storage bin of the present invention may be positioned between two adjacent strips, whether they be separate independent strips as shown in FIG. 1, or a unitary support member as shown in FIGS. 7 and 9. However, the present invention may be advantageously employed with a storage bin that straddles two or more openings between strips. FIG. 10 illustrates such a storage bin 80 which may be used with unitary support member 82 which has strips 84, 86, 88 and 90. The storage bin 80 shown in FIG. 10 has two reduced width portions 92 and 94 at the bottom of storage bin 80, and pins (not shown) extend from reduced width areas 92 and 94 in the same manner as has been described herein. In this embodiment, the storage bin 80 is installed on unitary support member 82 such that reduced width area 92 is positioned and locked between strips 84 and 86, while reduced width area 94 is positioned and locked between strips 88 and 90.

FIG. 10 also illustrates the versatility of the present invention insofar as the actual configuration of the storage area of the storage bin is concerned. The particular storage bin 80 shown in FIG. 10 is a unit which may be advantageously used for grocery bags. Outer walls 96 and 98 have openings such as 100 and 102, which can be used to hold the handles of plastic grocery bags. Internal partitions such as partition 104 provide spacers between bags and prevent the bags from hitting one another during movement of the vehicle. As indicated previously, numerous other types of storage bins can be employed with the present invention by providing them with appropriate pins adapted to be received in appropriate strips.

Figure 11:
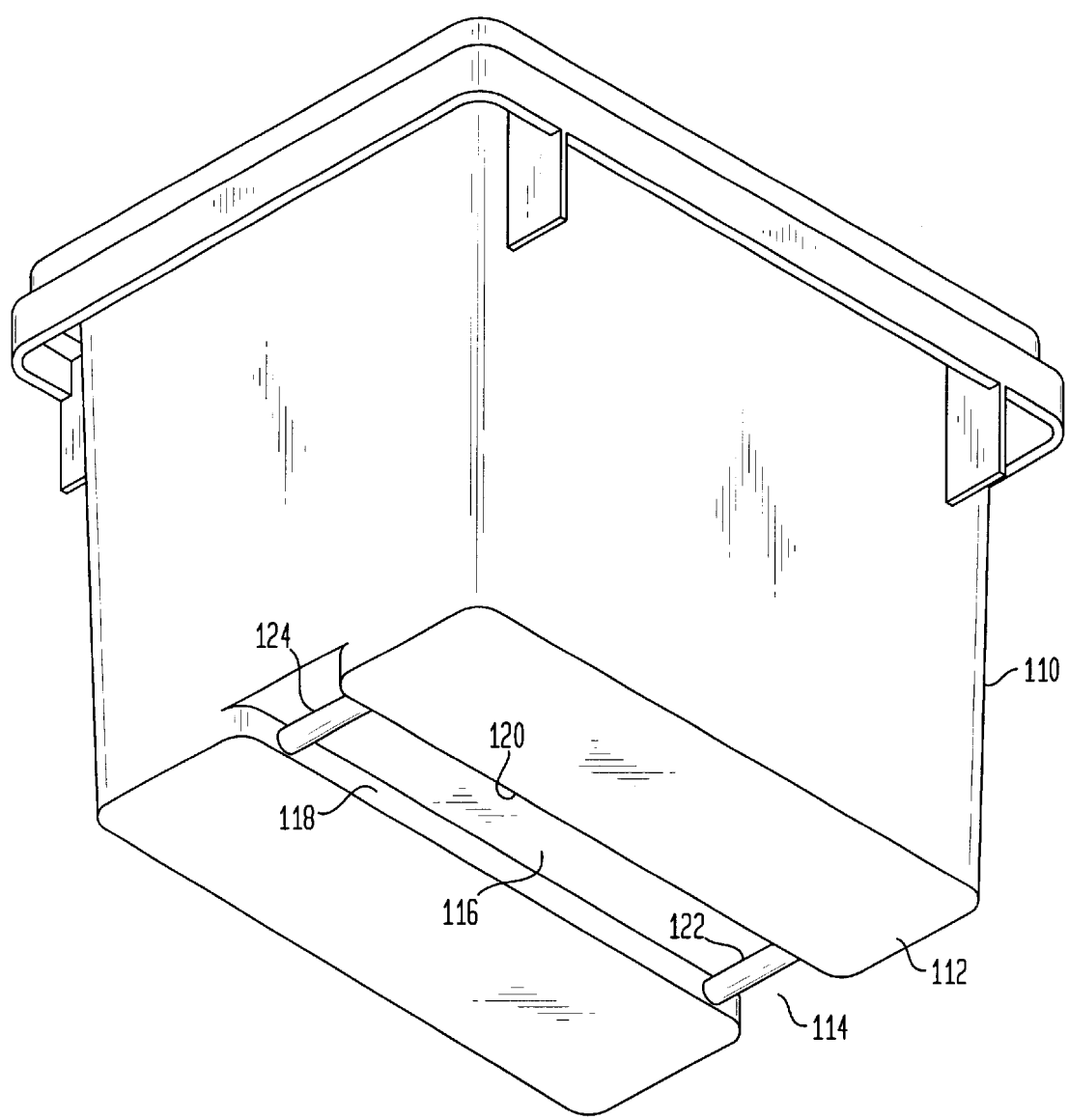
FIG. 11 is a perspective view of the storage bin of a further embodiment of the present invention employing pins mounted proximate the bottom of the storage bin.
Figure 12:
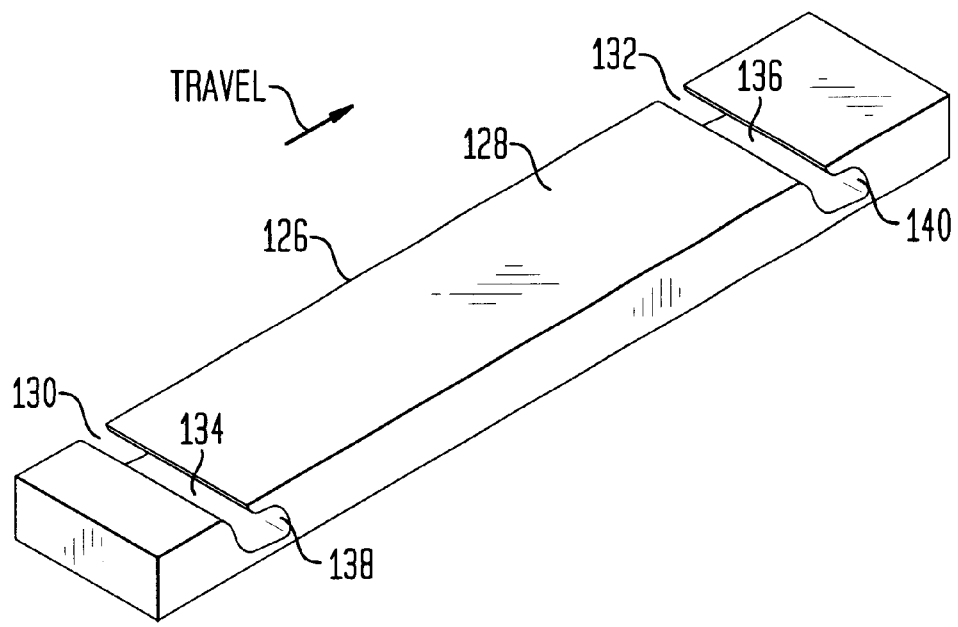
FIG. 12 is a perspective view of a strip of the present invention designed to be employed with the storage bin shown in FIG. 11.

FIGS. 11 and 12 illustrate yet a further embodiment of the present invention. As seen in FIG. 11, storage bin 110 has a generally flat bottom surface 112. Formed within this bottom surface 112 is a recess 114 having a generally flat inner surface 116 which is generally parallel to the bottom surface 112, as well as side surfaces 118 and 120. Pins 122 and 124 are mounted between the side surfaces 118 and 120 to straddle the recess 114. It will be understood that sufficient spacing must be left between the pins 122 and 124 and the inner surface 116 for reasons which will become apparent momentarily.

Referring now to FIG. 12, there is shown a strip 126 which is employed with the bin shown in FIG. 11. The strip 126 has a top surface 128 which is generally flat. Formed within the top surface 128 are openings 130 and 132. Each of these openings has a vertically oriented entrance 134, 136 and a horizontal segment 138, 140. The spacing between the openings 130 and 132 is the same as the spacing between the pins 122 and 124 on the bin 110.

The strip 126 is mounted to the upper surface of the vehicle in the manner previously described. The bin 110 is then positioned over the strip 126 such that the pins 122 and 124 are positioned above the vertical segments 134, 136 of the openings 130, 132. The bin is initially moved downwardly such that the pins 122, 124 travel to the bottom of the vertical segments 134, 136. The bin is then moved horizontally such that the pins 122, 124 move toward the end of the horizontal segments 138 and 140. The openings 130 and 132 may include the locking mechanism described previously and illustrated in FIG. 13.

In this embodiment in FIGS. 11 and 12, the horizontal segments 138 and 140 are positioned such that they extend in the direction of vehicle travel. In that way, as explained in connection with other embodiments, in the event of deceleration, the bin 110 will tend to continue traveling forward, which will thus tighten the connection between the bin 110 and the strip 126.

Figure 14:
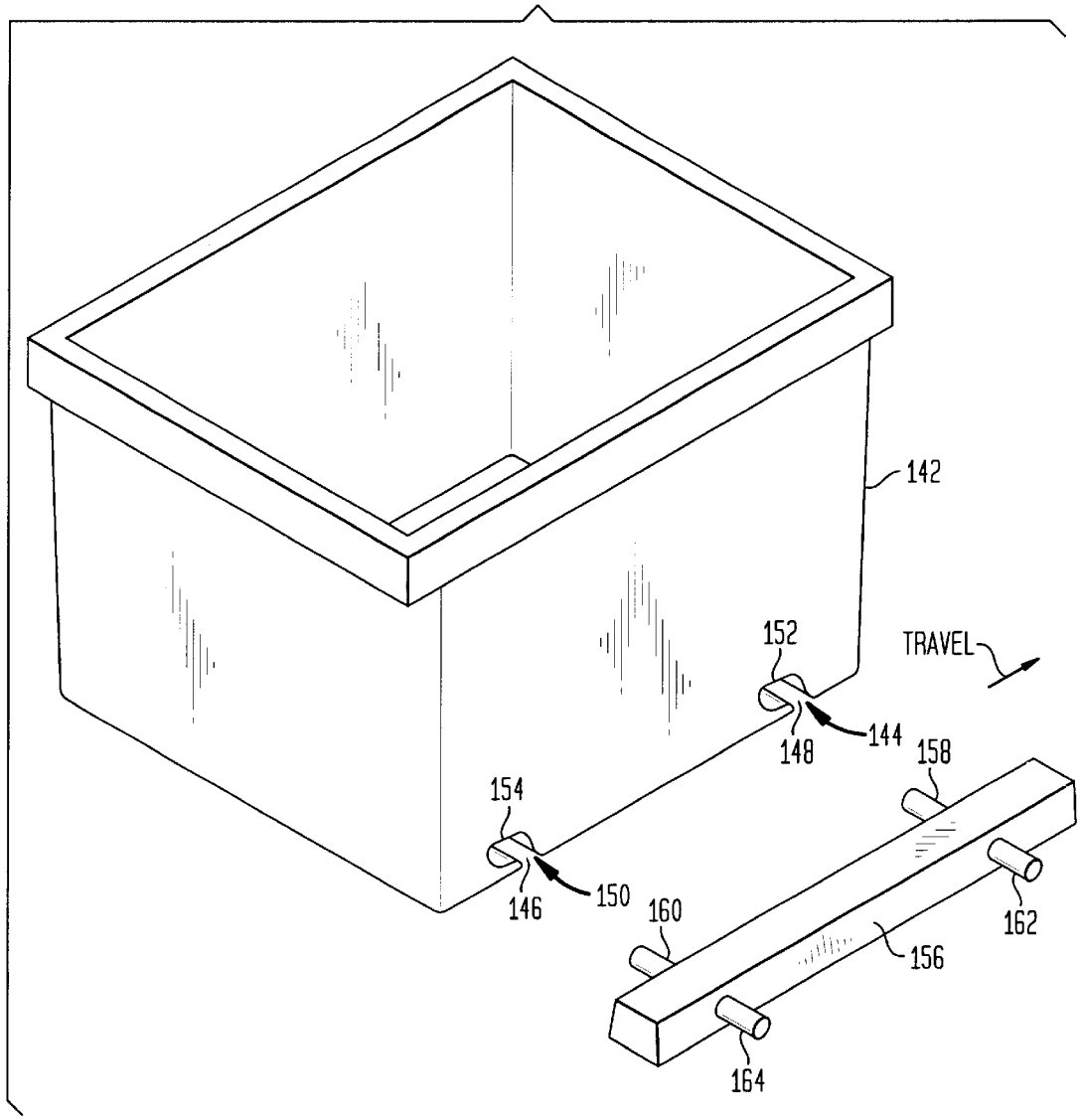
FIG. 14 is a perspective view of a further embodiment of the present invention in which pins are mounted to the strips and openings are formed within the storage bins.

Yet another embodiment of the present invention is shown in FIG. 14. In this embodiment, the bin 142 has openings 144 and 146 formed in the bottom of the bin 142. This can be accomplished through molding techniques or other methods known to those skilled in the art. The openings 144 and 146 have generally vertical opening sections 148 and 150 which lead to horizontally extending segments 152 and 154, which horizontal segments extend rearwardly opposite the direction of travel.

The strip 156 has pins 158 and 160 extending outwardly from a side wall of strip 156. The spacing between pins 158 and 160 corresponds to the spacing between openings 144 and 146. In the embodiment shown in FIG. 14, the strip 156 also has pins 162 and 164 extending from the opposite side of strip 156, but it will be appreciated that these pins are not needed to mount a single bin 142. However, the opposite side of bin 142 will preferably have openings similar to openings 144 and 146 (not shown), which are designed to engage with an additional strip having corresponding pins (also not shown). The strips in this embodiment may be separate or may be joined in a unitary support member as previously described.

In this embodiment of FIG. 14, with the strip 156 having been mounted in the vehicle, the bin 142 is mounted by placing the bin in a location such that the openings 144 and 146 are positioned above the pins 158 and 160. The bin 142 is then lowered such that the pins 158, 160 pass through the vertical segments 148 and 150 of the openings 144 and 146. The bin 142 is then moved forward in the direction of vehicle travel, such that the pins become positioned deeply within the horizontal segments 152 and 154 of the openings 144 and 146. If desired, the locking mechanism as previously described and as shown in FIG. 13 may be included within the openings 144 and 146.

The embodiment shown in FIG. 14 makes the same advantageous use of the deceleration of the vehicle in order to tighten the fit between the strip 156 and the bin 142. It would be appreciated that upon deceleration, the bin 142 will be urged in a forward direction, which will thus result in the pins 158, 160 being positioned more deeply within the horizontal segments 152, 154.

As these and other variations and combinations of the features discussed above can be utilized without departing from the present invention as defined in the claims, the foregoing description of the preferred embodiment should be taken as illustrating, rather than limiting, the invention as claimed.

What is claimed is:

1. An apparatus for providing storage space in a vehicle having a substantially flat horizontally oriented surface, said apparatus comprising:

at least one strip adapted to be mounted to the flat surface of the vehicle;

at least one storage bin having walls defining an upper storage area and an outer surface of said storage bin;

at least one pin mounted to a lower portion of said storage bin, said at least one pin extending outwardly from said outer surface of the lower portion of said at least one bin and transversely to the direction of travel of the vehicle;

at least one opening formed in a longitudinal edge of said strip;

said at least one pin being adapted to be received in said at least one opening to securely hold said bin to said strip; and said at least one opening having a substantially vertical entrance segment connected to a substantially horizontal segment extending in the direction of travel of the vehicle such that deceleration of the vehicle urges said at least one pin more deeply into said horizontal segment.

2. An apparatus according to claim 1 wherein said at least one pin is mounted to the lower portion of said storage bin and wherein said at least one opening is formed in said at least one strip.

3. An apparatus according to claim 1 wherein said at least one storage bin has at least two of said pins extending from each of two opposite sides.

4. An apparatus according to claim 1 in which said at least one pin releasably locks into engagement with said horizontal segment of said at least one opening.

5. A method of providing storage space in a vehicle having a substantially flat horizontally oriented surface, said method comprising:

providing at least one strip adapted to be mounted to the flat surface of the vehicle and at least one storage bin having walls defining an upper storage area and an outer surface of said storage bin, at least one pin being mounted to extend outwardly from a lower portion of said outer surface of said storage bin, with at least one opening formed in a longitudinal edge of said strip, said at least one pin being adapted to be received in said at least one opening, said at least one opening having a substantially vertical entrance leading to a horizontal segment;

mounting said at least one strip to the flat surface of the vehicle; and mounting said at least one storage bin to said at least one strip such that said at least one pin enters said vertical entrance of said at least one opening and then enters into said horizontal segment of said at least one strip;

said mounting steps positioning said at least one pin so that it extends transversely to the direction of vehicle travel, and positioning said horizontal segments of said at least one opening such that deceleration of the vehicle urges said at least one pin more deeply into said horizontal segment.

6. A method according to claim 5 further comprising the step of releasably locking said at least one pin within said horizontal segment of said at least one opening.

7. An apparatus for providing storage space in a vehicle having a substantially flat horizontally oriented surface, said apparatus comprising:

a plurality of strips adapted to be mounted to the flat surface of the vehicle, at least two of said strips having openings facing toward each other which are adapted to receive pins affixed to a storage bin; and at least one storage bin having walls defining an upper storage area and an outer surface of said storage bin;

a plurality of pins extending outwardly from said outer surface of the bottom of said bin, at least one such pin extending from each of two opposite sides of said storage bin, said pins being adapted to be received in said openings in said strips, whereby when said storage bin is positioned between said at least two strips, the pins extending from said bin engage with said openings in said strips, such that the bins are securely held against said strips.

8. An apparatus according to claim 7 in which said at least two strips are positioned substantially parallel to one another.

9. An apparatus according to claim 7 in which said strips are oriented in a longitudinal direction corresponding to the direction of travel of the vehicle.

10. An apparatus according to claim 7 in which said storage bin has at least two of said pins extending from each of said two opposite sides.

11. An apparatus according to claim 10 in which said at least two pins extending from each side of said storage bin are spaced apart from each other to provide support over substantially the entire length of the storage bin.

12. An apparatus according to claim 7 in which said openings comprise a substantially vertically oriented segment extending downwardly from the upper surface of said strips to the interior of said strips, and a horizontal segment extending horizontally from the lower portion of said vertical segments.

13. An apparatus according to claim 12 in which said horizontal segment of said opening extends forward in the direction of travel of the vehicle.

14. An apparatus according to claim 7 in which the lower portion of said storage bin is reduced in width with respect to the upper portion of said storage bin, and in which said pins extend from said reduced width portion of said bin.

15. An apparatus according to claim 14 in which said pins do not extend beyond the width of said remaining portion of said storage bin.

16. A method of providing storage space in a vehicle having a substantially flat horizontally oriented surface, said method comprising:

mounting a plurality of strips to said flat surface, with at least two of said strips having openings facing one another which are adapted to receive pins affixed to a storage bin; and mounting a storage bin having walls defining an upper storage area and an outside surface of said storage bin, and a plurality of pins extending outwardly from the bottom of said outside surface of said bin with at least one such pin extending from each of two opposite sides to said strips such that said pins are received in said openings in said strips whereby the bins are securely held against said strips.

17. A method according to claim 16 in which said openings have a vertically oriented segment extending downwardly from the top surface of said strip to the interior of said strip and a horizontal segment extending horizontally from the bottom of said vertical segment, wherein said mounting step comprises first moving said storage bin vertically such that said pins travel downwardly through said vertical segments, and then moving said bin horizontally such that said pins travel through said horizontal segments of said openings.

18. A method according to claim 17 wherein said mounting step includes mounting said strips such that said horizontal segments extend longitudinally in the direction of travel of the vehicle, and wherein said storage bin is moved forward in the direction of travel when said pins are in said horizontal segments of said openings.

19. An apparatus for providing storage space in a vehicle having a substantially flat horizontally oriented surface, said apparatus comprising:

at least one strip having a substantially flat top surface adapted to be mounted to the horizontally oriented surface of the vehicle, said at least one strip having an opening in said flat top surface adapted to receive a pin affixed to a storage bin; and at least one storage bin having: walls defining an upper storage area, an outer surface including a bottom surface, and an upwardly extending recess formed in said bottom surface from vertical and horizontal edges of said bin; and a pin mounted proximate the bottom of said bin extending outward across said recess, said pin being adapted to be received in said opening in said strip, whereby when said storage bin is positioned above said strip, said pin mounted to said bin engages with said opening in said strip, such that said bin is securely held against said strip.

20. An apparatus according to claim 19 in which said strip is oriented in a longitudinal direction corresponding to the direction of travel of the vehicle.

21. An apparatus according to claim 19 in which said opening comprises a substantially vertically oriented segment extending downwardly from said top surface of said strip to the interior of said strip, and a horizontal segment extending horizontally from the lower portion of said vertical segment.

22. An apparatus according to claim 21 in which said horizontal segment of said opening extends forward in the direction of travel of the vehicle.

23. A method of providing storage space in a vehicle having a substantially flat horizontally oriented surface, said method comprising:

mounting a strip to said flat surface of the vehicle, said strip having a substantially flat top surface and an opening formed in its flat top surface adapted to receive a pin affixed to a storage bin; and mounting a storage bin, having walls defining an upper storage area and an outer surface, and a pin mounted to and extending outwardly from the bottom of said outer surface of said bin, to said strip, such that said pin is received in said opening in said strip, whereby the bin is securely held against the strip.

24. A method according to claim 23 further comprising releasably locking said pin within said horizontal segment of said opening.

* * * * *